(12) United States Patent
Lutz, II (10) Patent No.: US 7,007,316 B2
(45) Date of Patent: Mar. 7, 2006

(54) EMERGENCY SHOWER AND EYEWASH STATION WITH TEMPERATURE CONTROL

(75) Inventor: Kenneth E. Lutz, II, Hickory Corners, MI (US)

(73) Assignee: Keltech, Inc., Delton, MI (US)

( * ) Notice: Subject to any disclaimer, the term of this patent is extended or adjusted under 35 U.S.C. 154(b) by 249 days.

(21) Appl. No.: 10/646,588

(22) Filed: Aug. 21, 2003

(65) Prior Publication Data

US 2004/0039354 A1   Feb. 26, 2004

Related U.S. Application Data

(60) Provisional application No. 60/405,002, filed on Aug. 21, 2002.

(51) Int. Cl.
*A61H 33/00* (2006.01)
*A61H 33/04* (2006.01)

(52) U.S. Cl. ........................................... 4/620
(58) Field of Classification Search ............ 4/615, 4/620
See application file for complete search history.

(56) References Cited

U.S. PATENT DOCUMENTS

| | | | |
|---|---|---|---|
| 4,084,270 A * | 4/1978 | Kersten, Jr. | 4/62 |
| 4,970,373 A | 11/1990 | Lutz et al. | |
| 5,265,288 A * | 11/1993 | Allison | 4/620 |
| 5,647,531 A | 7/1997 | Kline et al. | |
| 6,464,000 B1 | 10/2002 | Kloster | |
| 6,711,758 B1 * | 3/2004 | Terek et al. | 4/620 |

* cited by examiner

*Primary Examiner*—Tuan Nguyen
(74) *Attorney, Agent, or Firm*—Miller, Canfield, Paddock and Stone; Robert K. Roth (57) ABSTRACT

An emergency water release device comprises heating elements adapted to heat water, a shower and an eyewash, a valve and a controller which sends a first signal to turn off at least one of the plurality of heating elements when a temperature of the water exceeds a predetermined limit, and when a flow rate of the water is reduced to a reduced flow rate, the valve opens so that water is dispersed away from both the shower and the eyewash in an amount equal to the difference between the flow rate and the reduced flow rate. The heating elements form a first set electrically connected in series which provides heat for water to be dispensed by the shower, a second set electrically connected in series which provides heat for water to be dispensed by the eyewash. The first and second set of heating elements can be connected in parallel. The controller may also be configured to send a signal to another valve to open so that unheated water is mixed with heated water.

10 Claims, 5 Drawing Sheets

TO DRAIN

EMERGENCY SHOWER AND EYEWASH STATION WITH TEMPERATURE CONTROL

RELATED APPLICATION

This application claims priority benefit to U.S. Provisional Patent Application No. 60/405,002, filed on Aug. 21, 2002.

FIELD OF THE INVENTION

This invention relates to an apparatus for heating water, and more particularly, to an emergency shower and eyewash station with a temperature controller.

BACKGROUND OF THE INVENTION

Emergency shower and eyewash stations are often used when there is a risk that an individual may be exposed to hazardous chemicals. One who is exposed stands under the shower (or at the eyewash) for an extended period of time to flush away any such hazardous chemicals. Hypothermia or shock can occur if one is required to stand under an emergency shower for an extended period of time under cold water, especially where the surrounding environment is cold. Emergency shower and eyewash heaters have been provided to heat the water, and can comprise water tanks which are heated to supply a steady stream of warm water. However, such tanks are expensive and the duration of the shower is limited by the size of the tank. One solution to this problem has been the use of an instantaneous water heater, where the water is heated only on demand, that is, only on use of the shower or eyewash. With such designs there is also the need for better temperature control of the water reaching the shower and eyewash.

U.S. Pat. No. 5,647,531 to Kline et al discloses a control valve system for use in emergency shower and eyewash systems. The valve system mixes cold water with hot water to regulate the temperature of the water delivered to the shower and eyewash. However, such mixing valves are relatively costly. Emergency shower and eyewash stations have also been developed with on-demand heaters having controllers which monitor the output temperature of the water from the heater and attempt to hold that temperature with a predetermined range. However, such known designs do not prevent overshoot of water temperature upon reduction of a water flow rate from a high rate to a lower rate, as occurs, for example, when either the shower or the eyewash is shut off, or the shower is shut off and the eyewash is left on, etc. It would be desirable to have an emergency shower and eyewash station with heated water which avoids problems with temperature overshoot upon reduction of the flow rate of water.

SUMMARY OF THE INVENTION

In accordance with a first aspect, an emergency water release device comprises a plurality of heating elements adapted to heat water, a shower adapted to dispense water, an eyewash adapted to dispense water, a valve and a controller which sends a first signal to the plurality of heating elements to turn off at least one of the plurality of heating elements when a temperature of the water exceeds a predetermined limit, wherein when a flow rate of the water is reduced to a reduced flow rate, the valve opens so that water is dispersed away from both the shower and the eyewash in an amount equal to the difference between the flow rate and the reduced flow rate.

In accordance with another aspect, the plurality of heating elements comprise a first set of heating elements electrically connected in series which provides heat for water to be dispensed by the shower, a second set of heating elements electrically connected in series which provides heat for water to be dispensed by the eyewash, and the first set and the second set are electrically connected in parallel.

In accordance with another aspect, the controller can, in response to a temperature of the water exceeding a first predetermined limit, send a first signal to a solenoid valve to open so that unheated water is mixed with the heated water; and in response to the temperature of the water exceeding a second predetermined limit greater than the first predetermined limit, the controller can send a signal to turn off at least one of the plurality of heating elements.

It should be understood that the appended drawings are not necessarily to scale, presenting a somewhat simplified representation of various preferred features illustrative of the basic principles of the invention. The specific design features of the emergency shower and eyewash station as disclosed here will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the station illustrated in the drawings. In general, top and up refer to a direction extending up along the plane of the paper in FIG. 1, and bottom or down or downward refers to a direction down along the plane of the paper in FIG. 1.

DETAILED DESCRIPTION OF CERTAIN PREFERRED EMBODIMENTS

It will be apparent to those skilled in the art, that is, to those who have knowledge or experience in this area of technology that many uses and design variations are possible for the emergency shower and eyewash station with temperature control disclosed herein. The following detailed discussion of various alternative and preferred features and embodiments will illustrate the general principles of the invention with reference to a heater for use with both a shower and an eyewash. Other embodiments suitable for other applications will be apparent to those skilled in the art given the benefit of this disclosure.

Figure 1:
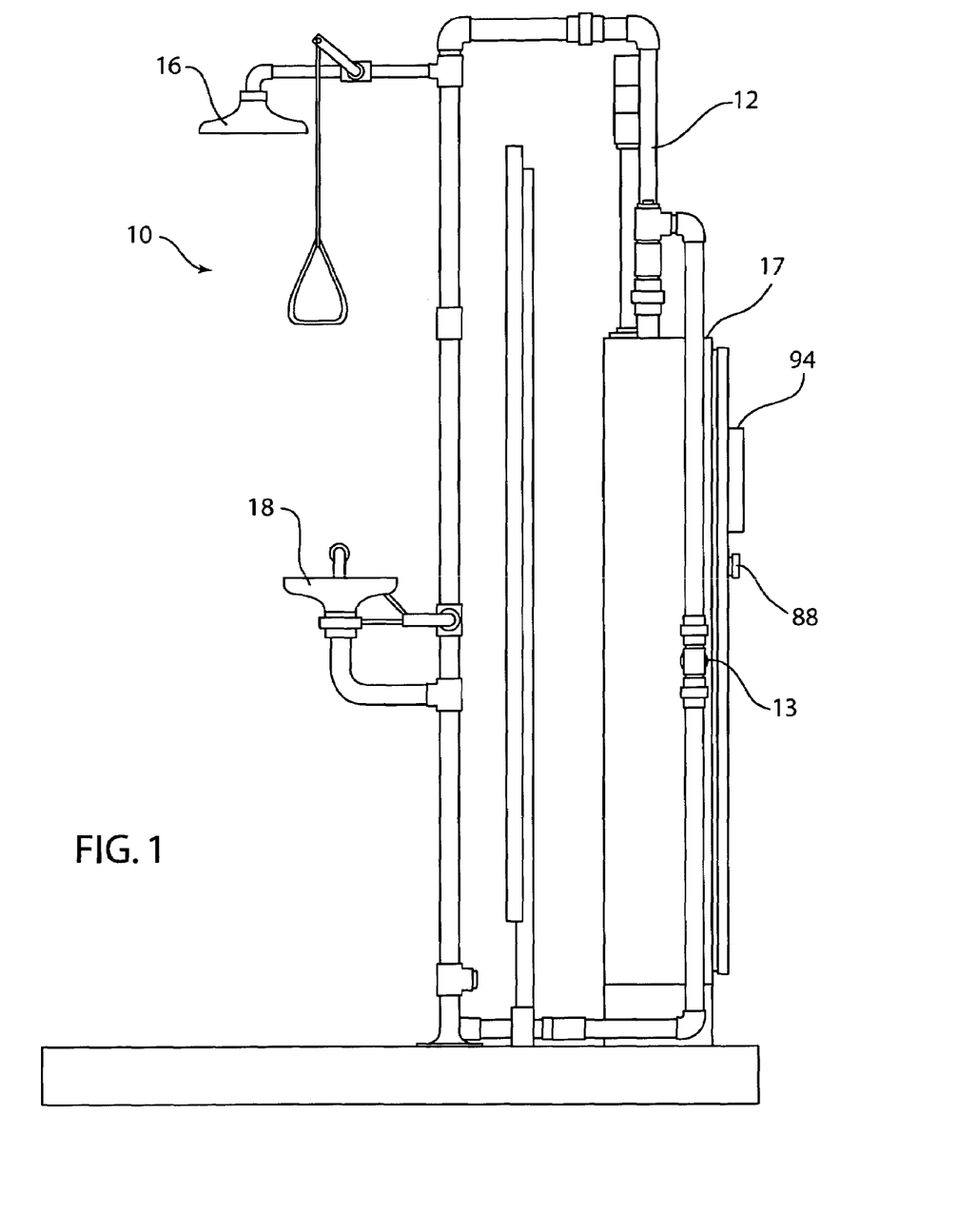
FIG. 1 is a side view of an emergency shower and eyewash station in accordance with a first preferred embodiment.
Figure 2:
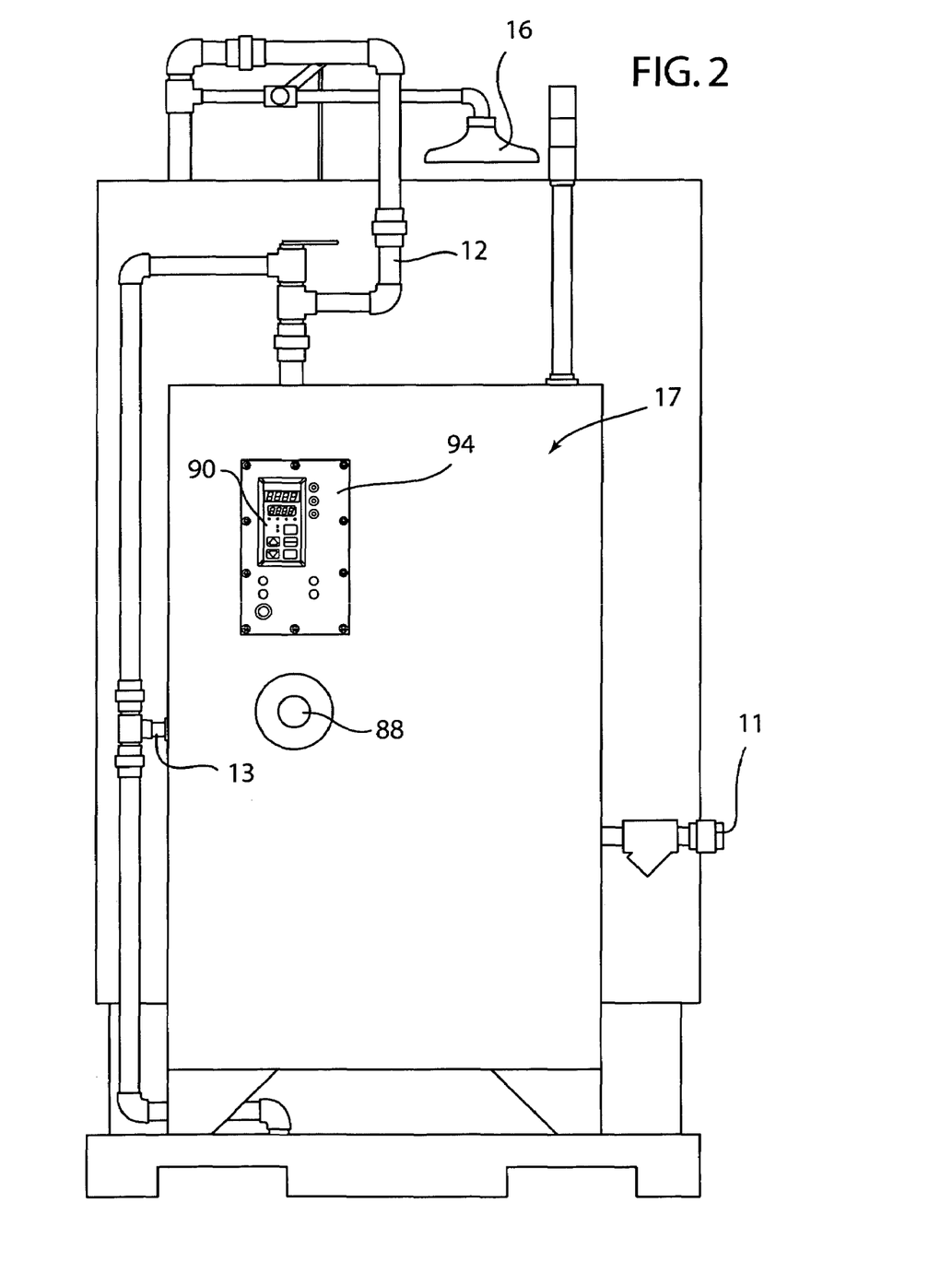
FIG. 2 is a back view of the emergency shower and eyewash station of FIG. 1, showing a temperature display and heater controls.

Referring now to the drawings, FIG. 1 shows an emergency shower and eyewash station 10 in accordance with a preferred embodiment. Water is heated by tankless water heater 17, and can be dispensed by either shower 16, eyewash 18 or both. Water flow is activated by the operator in a known manner. FIG. 2 shows the back of the station 10. The heater 17 is preferably enclosed, and a controller 40 is mounted to the inside of the wall or door of the enclosure. A display 90 is visible, with lights 94 corresponding to one of several indicators, discussed in greater detail below. Optionally emergency stop 88 may also be provided. Water comes in through inlet 11, is heated in the heater, and exits either through outlet 12 where it is dispensed to either the shower or the eyewash, or both, or the water exits through dump 13.

Figure 3:
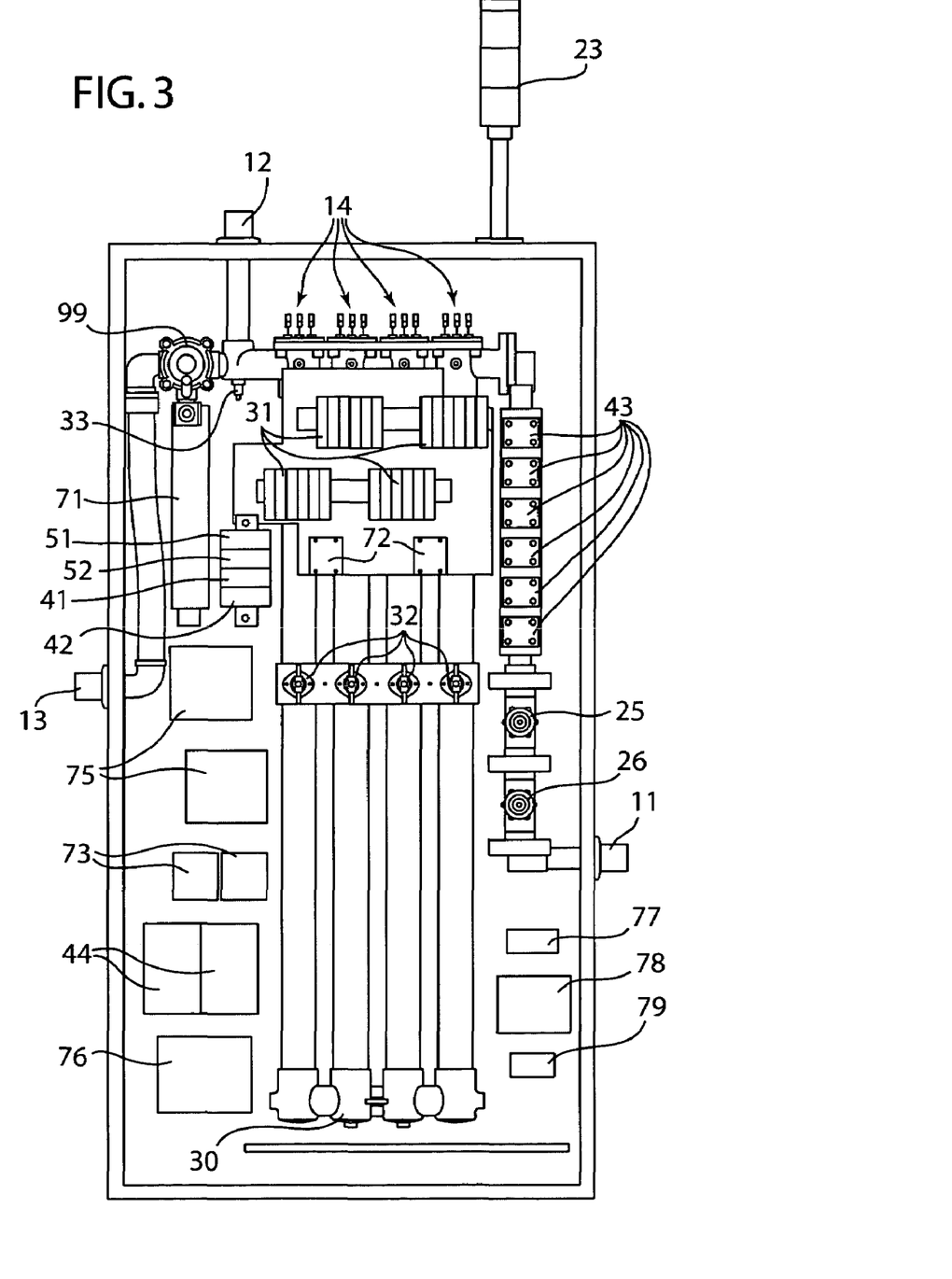
FIG. 3 is a schematic of the heater of the preferred embodiment of FIG. 1.
Figure 4:
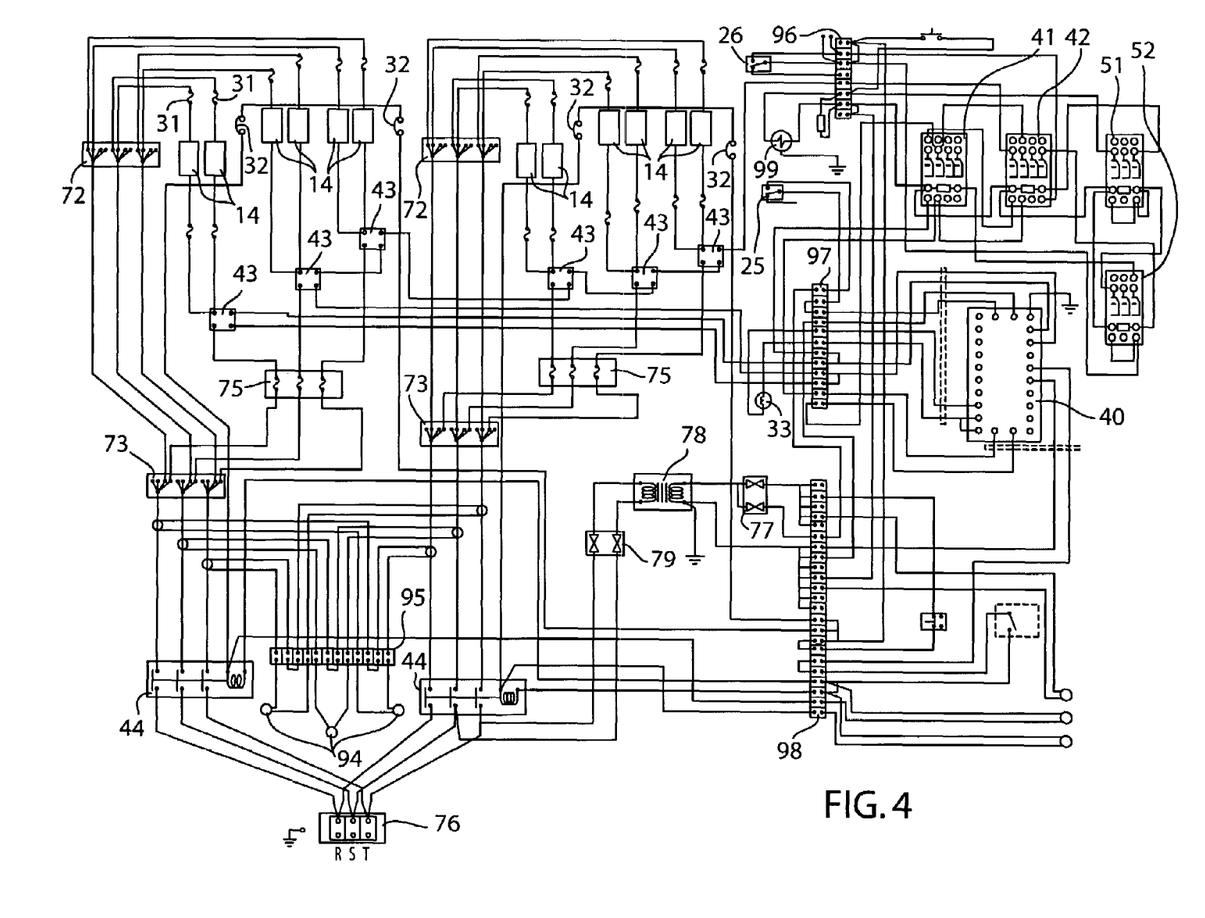
FIG. 4 is a diagram of the heater circuitry in accordance with the preferred embodiment of FIG. 1

FIG. 3 shows a schematic of the heater 17, with the display 90 removed for clarity of illustration. In this preferred embodiment, the controller 40 is mounted within the enclosure of the heater. FIG. 4 shows the circuit connecting the controller 40 to the various components shown in FIG. 3. As best seen in FIG. 3, water comes in through inlet 11 and passes through high flow switch 26 and low flow switch 25. Preferably the switches are brass flow switches: flow switch 25 is calibrated to activate (close the switch contacts and send an activation signal to the controller) at a low or eyewash flow rate of water exists and flow switch 26 is calibrated to activate and send an activation signal to the controller at a high or shower flow rate of water. Preferably these flow switches are non-obstructive, low pressure drop, shuttle type switches. It will be readily apparent to those skilled in the art, given the benefit of this disclosure, that other switches may be substituted here, including for example, a single switch capable of sending both a shower activation signal and an eyewash activation signal, depending on the flow rate.

The main enclosure for the heater can be, for example, a standard dimension NEMA 4 enclosure which will contain the heat exchanger 30 with the main plumbing inlet/outlet, main power electrical (including main power distribution 73, large fuse blocks 75, and main power block 76), and the high power/voltage control circuits discussed in greater detail below. Preferably the controller 40 is a 1/8 DIN temperature controller. This controller can have dual display 90 (process and setpoint display), dual output, event input and dual PID capabilities. All safety switches are preferably hard wired. The controller can be provided with two control relays 41, 42 and timers 51, 52. One of the control relays 41 turns on all but one of the relays 43 when a high flow (shower flow rate) signal is received. The other control relay 42 controls the dump valve 99 and, as discussed in greater detail below, opens the dump valve at startup and when the flow rate is reduced to reduce the temperature of the dispensed water due to latent heat. Two control timers 51, 52 can be used to regulate the dump time and to override the signal of the 'high flow' flow switch 26. One of the timers 51 controls the time that the dump valve 99 is in the open position and works in conjunction with one of the control relays 41. The other timer 52 sends a signal to override the 'high flow' flow switch 26 during the dump of water to remove latent heat.

The water is routed through a heat exchanger 30 having distribution blocks 72. Preferably the heat exchanger 30 is constructed of brass and copper with Incoloy 800 heating elements 14. All passageways are preferably about 1 inch minimum throughout.

The heater 17 preferably has six (6) solid state relays 43 to control twelve heating elements 14, or one for a pair of heating elements. A first set of heating elements is controlled by a first set of relays, and a second set of heating elements is controlled by a second set of relays. Preferably each set of heating elements is connected in series. Relays 43 can be, for example, Crydom relays positioned around the incoming water, effectively using the incoming water as a heat sink. As seen in FIG. 4, preferably the controller circuit will be arranged in such a way as to place five relays in one circuit in series and place those relays in parallel with another circuit of one solid state relay, permitting independent control of each set of relays and their corresponding heating elements. All of the relays can be used for the high power requirement when just the shower is activated. The one solid state relay can be used for low power requirements, such as when only the eyewash 18 is used. All of the relays can be used if both the shower and eyewash are in use. Preferably all of the heating elements 14 heat a single heat exchanger 30.

Transformer 78 provides control voltage for the heater, preferably about 120 V, advantageously permitting the use of relatively small control components. Transformer may also have primary side fuse 79 and secondary fuses 77. Two mechanical relays 44 may be provided for a positive mechanical disconnect for absolute circuit control. These relays are preferably hard wired for circuit disconnect for power-up or power-down of the system with the emergency stop, door switch, and bimetal thermal fuses 32, and soft wired for bulk control of power during the dumping of latent heat and as a safety override for all control functions for fail safe control of the output temperature of the heated water.

As shown in FIG. 3, a plurality of bimetal thermal overheat devices 32 can be mounted on the surface of the heat exchanger 30 to sense any overheat that the controller 40 system fails to respond to. These bimetal fuses 32 can be of a single pole design to provide a hard wire contact for mechanical breaking of the safety circuit in case of a thermal overheat. These bimetal fuses can be set to open at a temperature which exceeds the predetermined set temperature, such as, for example, with surface temperatures of 100° F.

As best seen in FIG. 4, load monitor lights 94 are provided, and shown to be connected to six current sensors. The load current sensors will be inserted on the power lines after the mechanical relays. These lights will be used to indicate load on lines after distribution of the power into two (2) separate load circuits. The lights will preferably light with a current load of 2 amps or greater.

Optionally the heater 17 can have a safety door switch to disconnect power (break power to a coil in main relays) when the door of the enclosure is opened. An emergency stop 88 may be provided that is wired in series with the door switch to disconnect power for operator interrupt. This mushroom switch 88 would be mounted on the front of the main control panel. The station may also be provided with a manual dump button located on the front control panel to provide a manual override of the dump valve. This button will allow manual activation of the dump valve anytime power is applied and the main mechanical relays are engaged.

Turning now to regular operation of the shower, upon activation of the shower 16 by an operator water flows through the heater and both flow switches 25, 26 close, indicating to the controller that water is flowing at a high rate. The controller 40 signals both control relays 41, 42 to close. The controller monitors the temperature via an input signal from the temperature sensor 33 positioned adjacent the output 12 to the shower and/or the eyewash.

Preferably the controller 40 holds the temperature of the water within a predetermined range, such as, for example ±2° F. of a set point (such as 80° F.) with no overshoot of the set point on initial startup. In accordance with a highly advantageous feature, this preferred embodiment may be accomplished by control of the heating elements, and by dumping excess water for a predetermined period of time when the shower is shut off. Water comes in through inlet 11 at a temperature below that of the set point. The controller 40 operates receiving an input PID A value corresponding to high rate water flow and in response sends a signal to provide power to all solid state relays 43. The relays 43 allow power to flow to the heating elements 14, heating the water.

If the temperature of the water exceeds the set point, the controller 40 will send a signal to release the main power relays 44. When the temperature has cooled to less than the set point the controller sends a signal to close the relays 44 and reactivate the heating elements. Display 90 can show water temperature and set point temperature. When use of the shower 16 is completed and the eyewash is not in use, the controller 40 sends a signal to cut power to the heating elements, and a signal to override the input from the flow switches 25, 26. Water continues to flow even though the shower is no longer in use, as the controller 40 sends a signal to valve 99 to open for a pre-determined period of time, allowing the water to flow through dump 13 and carry away latent heat of the heating elements. Once the pre-determined period of time passes, the controller sends a signal closing valve 99 and shutting off the flow of water through the dump 13. The heater 17 is now on standby for a new cycle.

Operation of the eyewash 18 is similar to operation of the shower, but requires less power from the heater 17. Upon activation of the eyewash 18 by an operator low flow switches 25 closes (but high flow switch 26 remains open), indicating that water is flowing at the low rate. The controller 40 signals only control relay 41 to close. The controller monitors the temperature via an input signal from the temperature sensor 33.

As before, preferably the controller 40 holds the temperature of the water within a predetermined range, such as, for example ±2° F. of a set point (such as 80° F.) with no overshoot of the set point on initial startup. The controller 40 operates receiving an input PID B value corresponding to low rate water flow and in response sends a signal to provide power to less than all solid state relays 43, most preferably only one solid state relay. The relay 43 allows power to flow to the second set of heating elements it controls, heating the water. The controller operates in the same manner as during operation of the shower to hold the temperature of the water below the set point and to prevent overheating upon shutdown, with the difference being that a second pre-determined period of time, less than the first pre-determined period of time, is used for the water dump cycle. Once the second pre-determined period of time passes, the controller sends a signal closing valve 99 and shutting off the flow of water though the dump 13. The heater 17 is now on standby for a new cycle.

For the situation where both the shower and eyewash are in operation and the shower is shut down special control procedures will occur to limit any latent heat build up in the heater. As the water is flowing, both flow switches 25, 26 are closed. When shower 16 is shut off and eyewash 18 still in use, the high flow switch 26 will open and the low flow switch 25 will remain closed, therefore the controller 40 will switch from PID A values to PID B values and only one solid state relay 43 will be powered. The high flow rate can be, for example, about 15 gallons per minute, and the low flow rate about 2 gallons per minute. The controller sends a signal to the valve 99 to open, allowing water to flow out dump 13 in an amount equal to the difference between the high flow rate and the low flow rate, giving the heating elements an ability to dump latent heat and avoid temperature overshoot at the eyewash.

Preferably valve 99 is a brass solenoid valve configured to divert flow down a drain at a relatively high flow rate (such as, for example, the flow rate of the shower) and will not be configured to obstruct or control the main flow of water through the heat exchanger.

Figure 5:
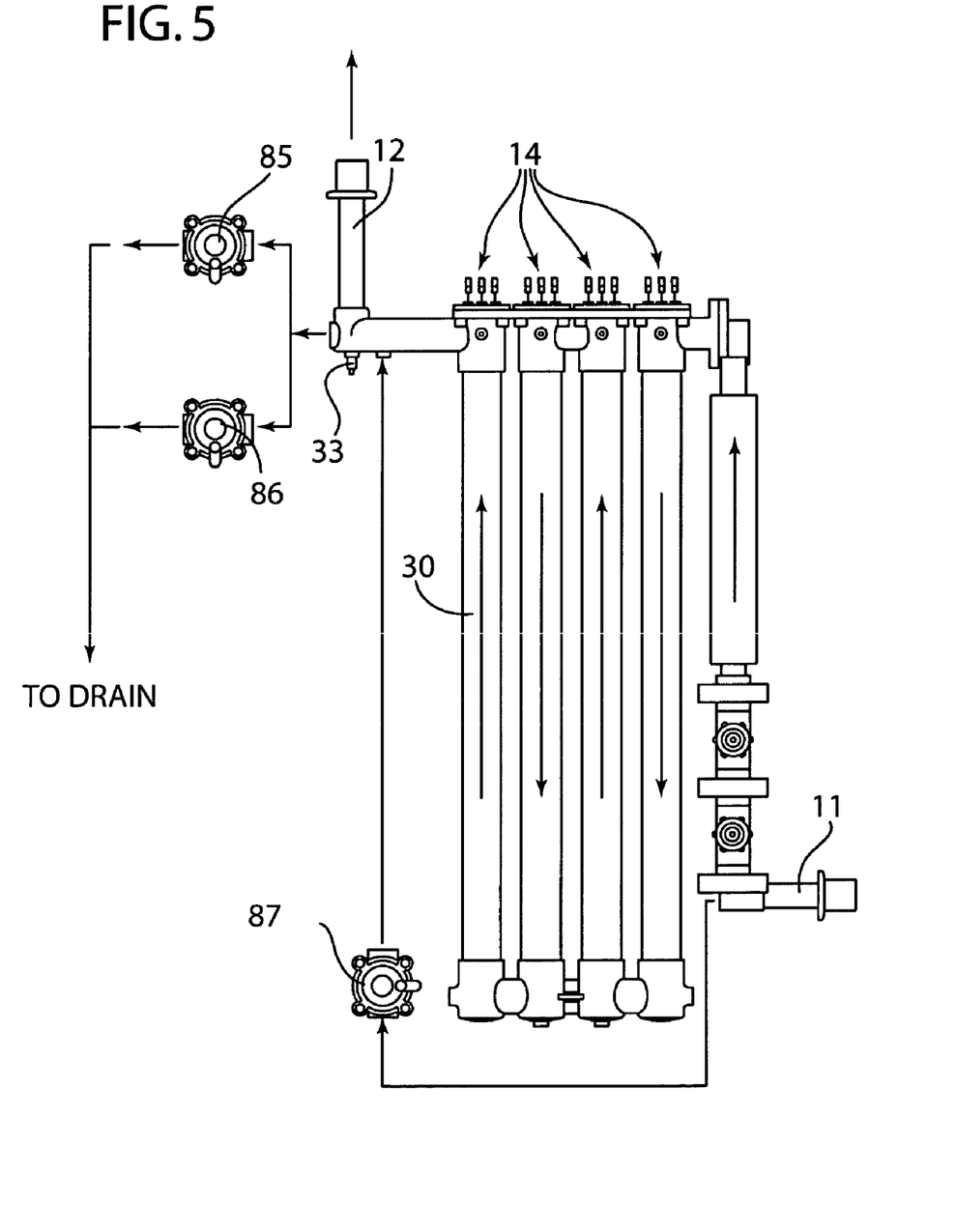
FIG. 5 is a schematic of an alternate preferred embodiment with additional valves and plumbing, and a PLC controller.

FIG. 5 shows a schematic of an alternate preferred embodiment where a PLC (programmable logic) controller may be used, along with three valves 87, 86, and 85. Components that are generally the same as in the first embodiment are not repeated for simplicity of illustration. The PLC units will have a programmable controller with PID temperature controller. All safety switches will be hard wired and soft wired into the PLC. The PLC controller shower and eyewash water heater may have a pressure switch to verify that the heater has sufficient water pressure to operate at the proper flow rates and to verify that the system was properly charged with water during the initial startup. It may have an automatic air venting valve at the highest point in the heat exchanger to remove all air from the heat exchanger during initial startup and remove any air that might pass through the feed lines and get trapped in the heat exchanger and vent it to the atmosphere outside the enclosure. This air venting valve will also assure that the pressure switch will only activate on the proper water pressure and not air pressure that might be built up during the initial system startup. The PLC controlled water heater is shown with three brass solenoid valves, 87, 86, 85. Each of these valves are preferably configured to divert flow and will not be configured to obstruct, reduce or control the main flow of water through the heat exchanger. In this embodiment, instead of only shunting water through a drain, initially cold water is mixed with the hot water to control the temperature and later in the heating cycle water may be dumped. Valve 87, along with appropriate plumbing, is configured to mix cold water from the inlet 11 with hot water that has passed through the heat exchanger 30. This additional flow of cold water is introduced to the outlet 12 of the heat exchanger 30 just prior to the final temperature sensor 33 that measures the temperature of the outgoing water. This cold water will be used to cool the water coming from the heating chambers in the event the temperature approaches a first predetermined alarm temperature limit, for example, 90° F.

If the temperature of the water continues to rise to a second predetermined limit, for example 95° F., then in the case of water flow through the shower the first set of heating elements are shut down. In the case of water flow through the eyewash, the second set of heating elements are shut down. When the temperature of the water falls back to the predetermined limit the heating elements are switched on again to maintain this set point. If the temperature again reaches the second predetermined limit, then the heating elements are shut down for the remainder of this heating cycle.

Once the heating cycle ends the second valve 86 opens for a period of time. Second valve 86 is preferably installed in the heat exchanger in such a way as to divert water out a secondary outlet that would dump water down a drain at a relatively high flow rate (for example, a flow rate equal to the flow rate of the shower). Once the period of time has elapsed, the heater is on standby, awaiting a new cycle. This valve 86 could also be used to remove latent heat and in a diagnostic cycle to simulate the flow rate of the shower.

Valve 85, like valve 86, diverts water out a secondary outlet that would dump water down a drain. However, this valve permits water to flow at a relatively low flow rate (equal to the flow rate of the eye wash). It will be readily apparent to those skilled in the art, given the benefit of this disclosure, that one valve capable of a pair of settings could be used in place of a pair of valves. Once the heating cycle ends the third valve 85 opens for a second period of time, generally less than the first period of time associated with the opening of valve 86. Once the second period of time has elapsed, the heater is on standby, awaiting a new cycle. This valve 85 could also be used to remove latent heat and in a diagnostic cycle to simulate the flow rate of the eyewash.

If both the shower and eyewash are in operation and the shower is shut down or if the shower is shut down and eyewash is immediately turned on then special control procedures should occur to limit the latent heat build up. For this preferred embodiment, both flow switches will be closed initially. When the shower is shut off and eyewash still in use, the high flow switch will open and the low flow switch will remain closed. The relay for the first set is signaled to shut off. Valve 86 opens to dump latent heat for a first pre-determined period of time. PLC controller 40 disregards activation of high flow switch during dump of latent heat. The controller will monitor PID temperature control functions and verify temperature maintenance within ±2° F. of the predetermined set point with no overshoot on initial startup. If the temperature of the water exceeds the predetermined set point then solenoid valve 87 opens allowing flow of cold water to blend with hot water to maintain the set point temperature.

The operator interface displays output temperature of the water, preferably continuously. If the temperature of the water exceeds a second predetermined limit (e.g. 95° F.) then the first set of heating elements should be shut down. When temperature cools to the predetermined set point the first set of heating elements are reinitialized to maintain the set point. If the temperature, even with blended water again reaches the second predetermined limit, then the first set of heating elements shut down for this cycle. When cycle ends solenoid valve 86 should open. During this operation the controller overrides signals from flow and pressure switches and keeps heating elements unpowered. After this is complete, the heater is now on standby for new cycle.

The diagnostic cycle mentioned above can be used during initial power up, when signaled by maintenance personal or operators using the operator interface panel, or during the periodic (user programmable) self initiated diagnostic. The diagnostic cycle can be used to determine any potential problems during operation or to prevent potential problems that may occur from extended periods of inactivity. The diagnostic cycle advantageously uses the aforementioned valves and the expected flow rates through the valves as part of a series of tests to determine that the station is functioning normally. The diagnostic cycle can comprise, for example, the following steps.

1. Initiation. The cycle would be initiated after a preset interval (user programmable) of non-use. The heater would contain a timer that would reset each time the system is used. If the timer is "timed out" the diagnostic cycle would initialize. The cycle can also be initialized though the operator interface panel at any time.

2. Eyewash Simulation. Solenoid valve 85 is initialized, simulating a flow rate equal to that of an eyewash. The low flow switch closes and the PLC controller signals one (1) relay to close initializing the second set of heating elements. The controller will monitor PID temperature control functions and verify temperature maintenance within ±2° F. of the set point with no overshoot on initial startup. If the temperature of the water exceeds 90° F. then solenoid valve 87 opens allowing flow of cold water to blend with hot water to maintain set point temperature. The operator interface displays the output temperature at all times and a message indicating the diagnostic cycle is in progress.

If temperature exceeds the second predetermined limit (95° F.) then the second set of the heating elements is shut down. When temperature cools to the first predetermined limit (90° F.) this set should be reinitialized to maintain the set point. If the temperature again reaches the 95° with blended water then the second set will be shut down and a error message will be displayed at the end of the cycle.

3. Combined Usage Simulation. Valve 86 is initialized. Valve 85 will remain open simulating shower and eyewash usage. The controller verifies that the PID temperature control functions and verifies that the temperature is within ±2° F. of the predetermined set point with no overshoot on initial startup. If the temperature exceeds 90° F. then solenoid valve 87 opens allowing a flow of cold water to blend with hot water to maintain the set point temperature. As described above, if the temperature again reaches the 95° with blended water then the heating elements will be shut down and a error message will be displayed at the end of the cycle. The operator interface should display output temperature at all times and a message indicating the diagnostic cycle is in progress 4. Shower to Eyewash simulation. Valve 86 is closed and the controller verifies that the high flow switch is open and the low flow switch remains closed. The relay for the heating elements will be signaled to shut off. Valve 86 is opened to dump latent heat for a pre-determined period of time. The controller disregards activation of high flow switch during dump of latent heat.

The controller monitors PID temperature control functions and verifies that the temperature of the water is within ±2° F. of the set point with no overshoot on initial startup. If the temperature of the water exceeds 90° F. then the solenoid valve 87 opens allowing a flow of cold water to blend with hot water to maintain set point temperature. As before, the operator interface should display output temperature at all times and should display that a message indicating the diagnostic cycle is in progress.

To simulate shutdown, the controller 40 closes all valves, 85, 86, 87. Next valve 86 is opened, disregarding high flow for a pre-determined period of time. As before, the controller overrides signals from flow and pressure switches and thereby keeps the heating elements off. At the end of the diagnostic cycle if no error messages have occurred a green light will be displayed and the timer will be reset.

If an error is detected, then an error messages is generated. This message is displayed on the screen and a yellow caution light will be lit. The heater would remain inactive until an operator intervenes to verify error messages.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An emergency water release device comprising, in combination:
   a plurality of heating elements adapted to heat water;
   a shower adapted to dispense water;
   an eyewash adapted to dispense water;
   a valve; and
   a controller which sends a first signal to turn off at least one of the plurality of heating elements when a temperature of the water exceeds a predetermined limit; and
   wherein when a flow rate of the water is reduced to a reduced flow rate, the valve opens so that water is dispersed away from both the shower and the eyewash in an amount equal to the difference between the flow rate and the reduced flow rate.

2. The emergency water release device of claim 1 wherein the flow rate is the rate of water dispensed through both the shower and the eyewash, and the reduced flow rate is one of the rate of water dispensed through the eyewash and no flow at all.

3. The emergency water release device of claim 1 wherein the valve is a solenoid valve, and the controller controls the solenoid valve.

4. The emergency water release device of claim 1 wherein water is dispersed through the valve for a predetermined period of time set by the controller in response to the flow rate of the water.

5. The emergency water release device of claim 1 further comprising a temperature input signal received by the controller corresponding to the temperature of the water after passing through the plurality of heating elements.

6. The emergency water release device of claim 1 further comprising:
   a shower activation signal;
   an eyewash activation signal;
   wherein upon receipt by the controller of one of the shower activation signal and the eyewash activation signal, or both, the controller sends a signal to turn on the heating elements to heat the water.

7. The emergency water release device of claim 6 wherein the controller holds the temperature of the water within a predetermined range.

8. An emergency water release device comprising, in combination:
   a shower adapted to dispense water;
   an eyewash adapted to dispense water;
   a plurality of heating elements adapted to heat water comprising
      a first set of heating elements electrically connected in series which provides heat for water to be dispensed by the shower,
      a second set of heating elements electrically connected in series which provides heat for water to be dispensed by the eyewash, and
      the first set and the second set are electrically connected in parallel; and
   a controller which sends a first signal to turn off at least one of the plurality of heating elements when a temperature of the water exceeds a predetermined limit.

9. The emergency eyewash release device of claim 8 further comprising
   a valve, and when a flow rate of the water is reduced to a reduced flow rate, the valve opens so that water is dispersed away from both the shower and the eyewash in an amount equal to the difference between the flow rate and the reduced flow rate.

10. The emergency water release device of claim 8 further comprising a heat exchanger, wherein all the first set of heating elements and all of the second set of heating elements apply heat to the heat exchanger.

* * * * *